Feb. 28, 1939.  J. P. SPANG  2,148,782
MACHINE FOR DICING VEGETABLES, MEAT, AND THE LIKE
Filed March 26, 1937   3 Sheets-Sheet 1
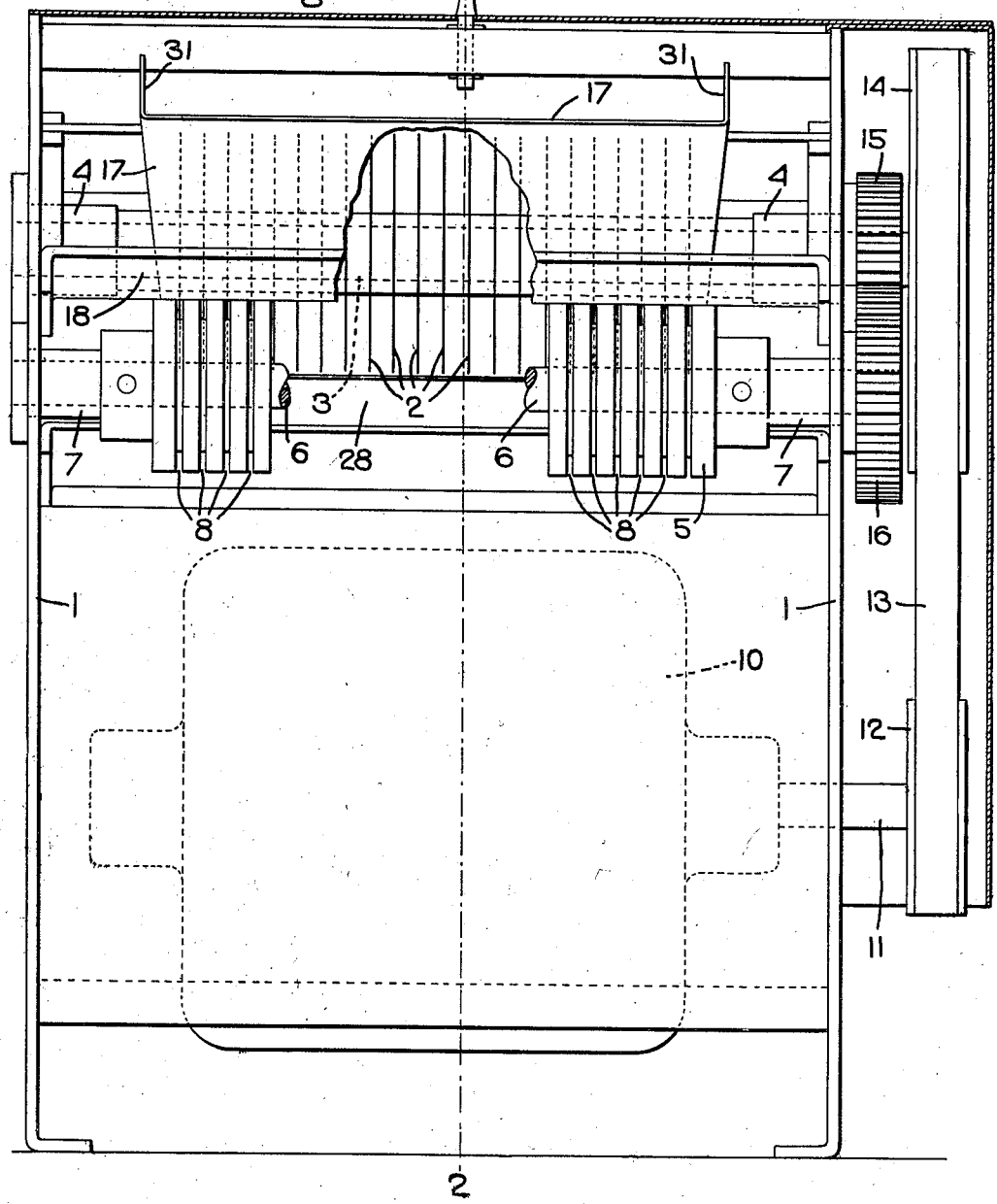
Inventor.
Joseph P. Spang
by Heard Smith & Tennant.
Attys.

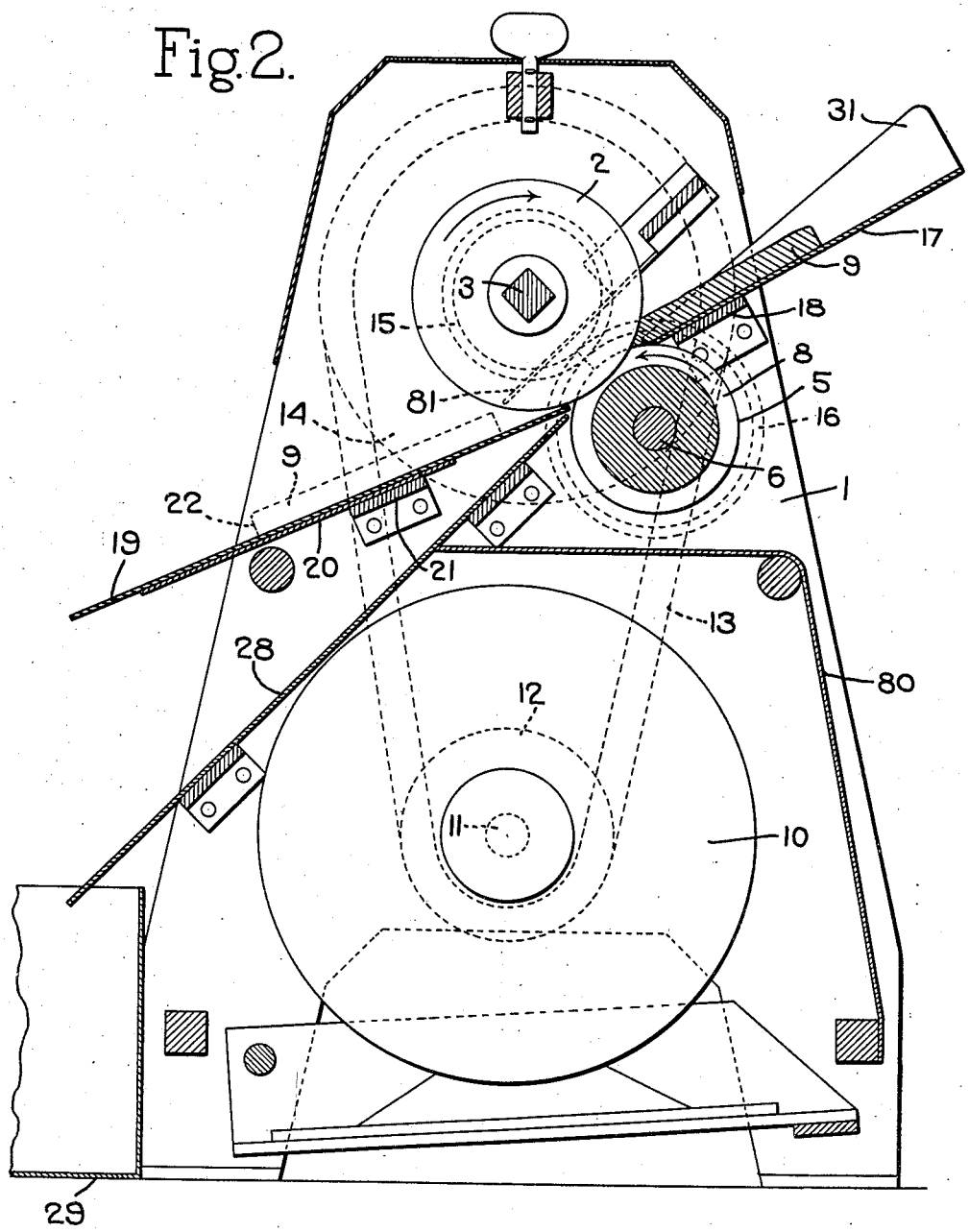

Feb. 28, 1939. J. P. SPANG 2,148,782
MACHINE FOR DICING VEGETABLES, MEAT, AND THE LIKE
Filed March 26, 1937   3 Sheets-Sheet 3
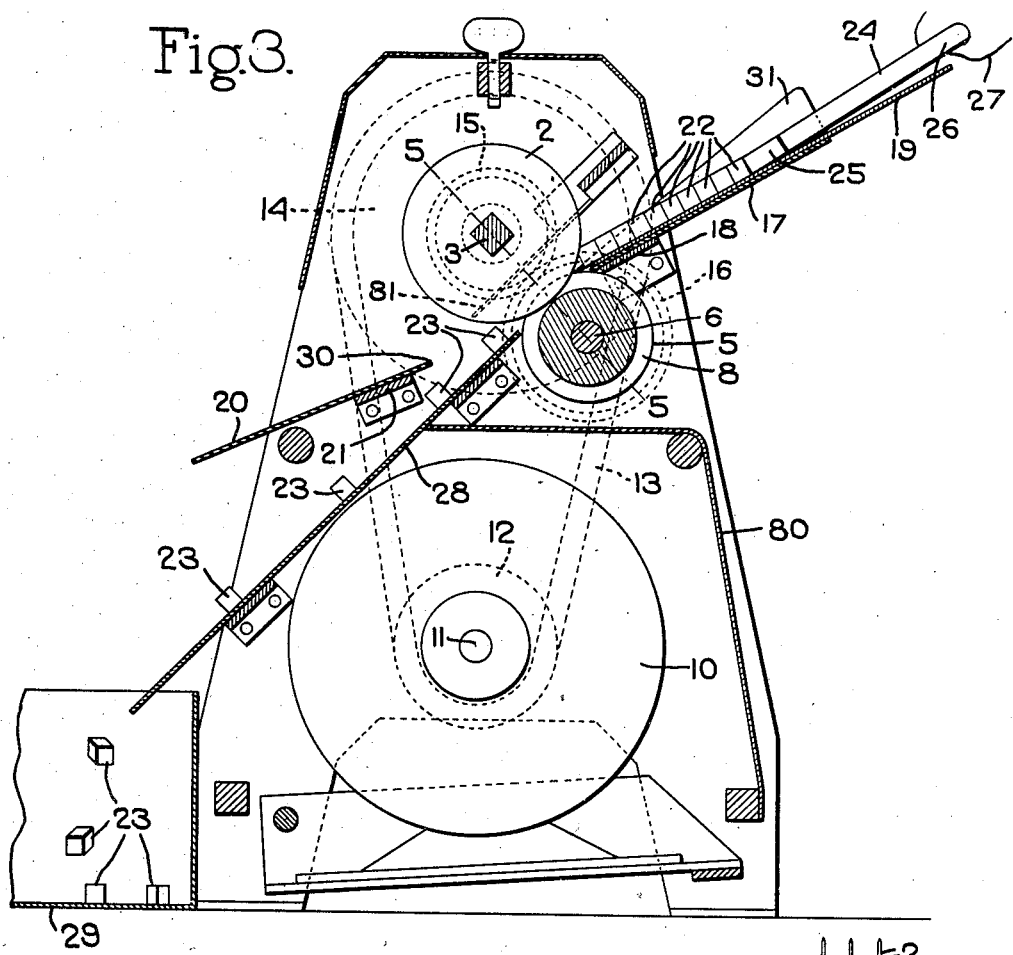
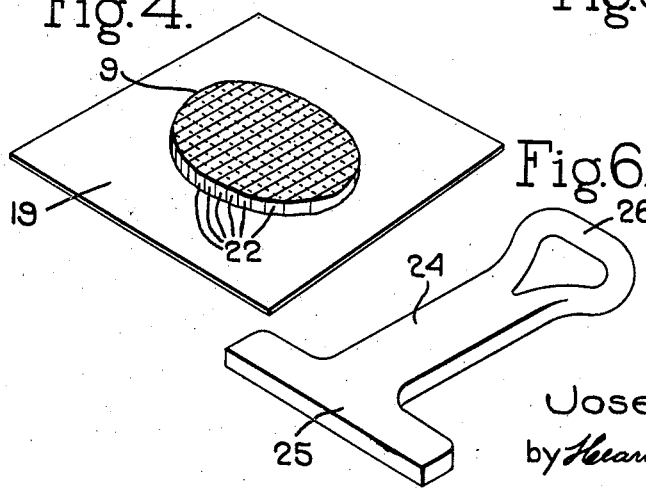
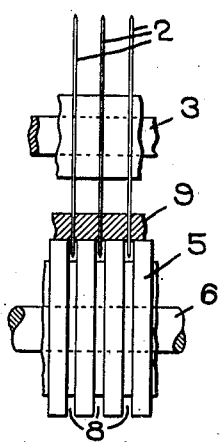
Inventor.
Joseph P. Spang
by Heard Smith & Tennant.
Attys.

Patented Feb. 28, 1939

2,148,782

UNITED STATES PATENT OFFICE 2,148,782

MACHINE FOR DICING VEGETABLES, MEAT, AND THE LIKE

Joseph P. Spang, Quincy, Mass.

Application March 26, 1937, Serial No. 133,173

6 Claims. (Cl. 146—98)

This invention relates to a machine designed for dicing fruit, vegetables, meat and other food products, and it has for its general object to provide an improved machine for this purpose which is simple in construction and efficient in operation and which has other novel features that will be hereinafter pointed out.

In the drawings wherein I have illustrated a selected embodiment of the invention;

Fig. 1 is a side view of a machine embodying my invention looking toward the left in Fig. 2 and with parts broken out to better show the construction;

Fig. 2 is a section on the line 2—2, Fig. 1 showing the operation when a slice of material is making its first pass through the machine;

Fig. 3 is a section similar to Fig. 2 but on a reduced scale showing the operation when the material is making its second pass through the machine;

Fig. 4 is a perspective view of the removable plate on which the material is received after its first pass through the machine and from which it is delivered for the second pass;

Fig. 5 is a fragmentary section on the line 5—5, Fig. 3;

Fig. 6 is a perspective view of a pusher which may be used for feeding the material through the machine when making the second pass;

The embodiment of the invention herein shown comprises a suitable frame 1 in which is mounted a set of rotary slitting knives 2, said knives being mounted on a shaft 3 that is suitably journalled in bearings 4 carried by the frame 1.

Cooperating with the slitting knives is a feed roller 5 carried by a shaft 6 which is also journalled in suitable bearings 7 with which the frame 1 is provided. Both the feed roll 5 and the knives 2 are positively rotated and the feed roll is formed with a plurality of peripheral grooves 8 in which the knives are received, so that the knives will cut clear through any material which is fed over the feed roll 5.

The knives may be rotated by any appropriate means and as herein shown there is provided a motor 10, the shaft 11 of which carries a driving pulley 12, and said pulley is belted by a driving belt 13 to a pulley 14 fast on the knife shaft 3.

The knife shaft 3 and the feed roll shaft 6 are geared together so that they rotate in opposite directions and with such relative speeds that the surface speed of the knives is greater than the surface speed of the feed roll.

In the construction illustrated the knife shaft 3 has a gear 15 fast thereon at one end which meshes with and drives another gear 16 that is fast on the fed roll shaft 6. The gears 15 and 16 are of such relative size that the surface speed of the feed roll 5 will be less than that of the knives 2. The arrows in Fig. 2 indicate the direction of rotation of the knives and the feed roll.

On the feed side of the machine there is provided a delivery platform 17 which is shown as being secured to a supporting bar 18 that extends across the frame. This delivery platform is shown as having an inclined position and it constitutes the platform over which the material 9 is fed to the knives 2 and feed roll 5.

19 indicates a receiving platform or plate on which the material 9 is received after it has made its first pass through the machine and from which it is delivered to the knives again for the second pass through the machine. This receiving plate 19 is separable from the machine and it functions to receive the material 9 after it makes its first pass through the machine and which then is in the form of strips, and to support the material in strip form while it is transported back to the delivery platform 17 from which it is again fed through the machine. During the second pass of the material through the machine the knives complete the dicing operation by cutting the strips into cubes.

20 indicates a supporting bed on which the receiving plate 19 may be placed to receive the material 9 when it makes its first pass through the machine. This supporting bed is shown as carried by and secured to a bar 21 which extends across the frame.

In the operation of the machine the receiving plate 19 will be placed on the supporting bed 20 as shown in Fig. 2 with one edge of the plate closely adjacent the feed roll 5. A slice 9 of the material to be diced is then placed on the delivery platform 17 and pushed forward until the front end thereof is engaged by the feed roll 5 and the knives 2. The action of the feed roll and the knives will feed the slice 9 through the machine, during which operation the knives cut the slice 9 into strips 22. After the slice 9 has been fed completely through the machine as shown in dotted lines Fig. 2, then the receiving plate 19 with the strips 22 thereon is removed from the machine and is placed on the receiving platform 17 in such a position that the strips 22 extend crosswise or transversely of the platform 17. In other words, when the receiving plate 19 with the strips 22 thereon is removed from the supporting platform 20 it will be given a 90° turn before it is placed on the delivery platform 17. The operator then applies a pushing force to the strips 22 so as to feed them successively to the feed roller 9 and knives, and as each strip passes under the knives it will be cut into cubes 23. While any suitable means of applying a feeding pressure to the strips 22 may be employed I have shown in Fig. 6 a pusher device 24 having a head portion 25 adapted to engage the strips 22 and having a handle portion 26 adapted to be gripped by the operator's hand 27.

Some feeding device of this type is necessary because the strips 22 lie parallel to the axes of the knives and rollers and while each strip will be fed past the knives and rollers after it has been engaged by them, yet it is necessary to apply a feeding force to the various strips in order to bring them successively into position to be acted on by the knives.

The cubes 23 into which the strips 22 are cut are deposited on a chute 28 by which they are conducted into a suitable receptacle 29. The chute 28 is placed at a much greater inclination than the supporting platform 20 and the upper edge of this chute 28 extends substantially to the feed roll 5. The upper edge 30 of the supporting platform 20, however, is spaced some distance from the feed roll so as the strips 22 are cut into the cubes 23 the latter will drop onto the upper end of the chute 28 and will gravitate down the steep slope underneath the supporting platform 20 and into the receptacle 29.

The delivery platform 17 is shown as having upstanding wings 31 at its sides, the purpose of these wings being to retain not only the slice of material 9 on the platform but also to assist in positioning the receiving plate 19.

In the embodiment of the invention above described there is a single set of knives and the dicing operation is performed by passing the material through the machine twice, the first pass resulting in cutting the slice into strips and the second pass resulting in cutting the strips into cubes.

I claim:

1. A machine for dicing vegetables, meat, and the like comprising a feed roll having peripheral grooves, a set of rotary knives dipping into said grooves, means to rotate the knives and the feed roll, a delivery platform from which material in slice form is fed to the knives and feed roll, a supporting platform on the delivery side of the knives, a receiving plate separable from the machine and adapted to be supported by the supporting platform and in position to receive the material in strip form as it is delivered from the knives, said receiving plate serving to support the strips of material while they are transferred to the receiving side of the knives with the strips running at right angles to the direction of feed whereby when the strips are fed to the knives they are cut into cubes, and a discharge chute situated beneath the supporting platform and adapted to receive the material in cubed form and convey it to a container.

2. A machine for dicing vegetables, meat, and the like comprising a feed roll having peripheral grooves, a set of rotary knives dipping into said grooves, means to rotate the knives and feed roll, a delivery platform from which the material is fed to said knives, a receiving plate separable from the machine, plate-supporting means on the delivery side of the knives adapted to support said receiving plate in position to receive the material in strip form as it is delivered from the knives, said receiving plate serving to support the material in strip form while it is transferred to the receiving side of the machine and again delivered to the knives and feed roll with the strips in position to be cut transversely by the knives into cubes, and a chute below the plate-supporting means into which the cubes are delivered.

3. A machine for dicing vegetables, meat, and the like comprising a feed roll having peripheral grooves, a set of rotary knives dipping into said grooves, means to rotate the knives and feed roll, a delivery platform from which the material is fed to said knives, a receiving plate separable from the machine, plate-supporting means on the delivery side of the knives to support the plate in position to receive the material in strip form as it is delivered from the knives, said receiving plate serving to support the material in strip form while it is transferred to the receiving side of the machine and again delivered to the knives and feed roll with the strips in position to be cut transversely by the knives into cubes, and a discharge chute on the delivery side of the knives situated to receive the cubed material and convey it to a container.

4. A machine for dicing vegetables, meat and the like comprising a feed roll having peripheral grooves, a set of rotary knives dipping into said grooves, means to rotate the knives and the feed roll, means for supporting the material to be diced as it is fed to the knives, a receiving plate separable from the machine, plate-supporting means on the delivery side of the knives adapted to support said receiving plate in position to receive the material in strip form as it is delivered from the knives, said receiving plate serving to support the material in strip form while it is transferred to the receiving side of the machine and again delivered to the knives and feed roll with the strips in position to be cut transversely by the knives into cubes, and a chute on the delivery side of the knives having its receiving end closely adjacent the feed roll and situated to receive the cubed material and convey it to a container, the plate-supporting means being spaced sufficiently from the feed roll to allow the cubed material to move freely along the chute.

5. A machine for dicing vegetables comprising a set of rotary knives, means to rotate the knives, means to feed the material to said knives whereby the latter cut the material into strips, a receiving plate separable from the machine, plate-supporting means on the delivery side of the knives to support the plate in position to receive the material in strip form as it is delivered from the knives, and a chute below the plate-supporting means and situated nearer to the knives than said plate-supporting means whereby when the material in strip form as it was delivered to the receiving plate is fed to the knives a second time and cut into cubes, the cubes will be delivered to and discharged from the chute.

6. A machine for dicing vegetables and meat comprising a set of rotary knives, means to rotate the knives, means supporting the material to be diced as it is fed to the knives, a supporting platform on the delivery side of the knives, a receiving plate separable from the machine and adapted to be supported by said platform in position to receive the material in strip form as it is delivered from the knives and an inclined chute situated below the platform and having its receiving end nearer the knives than said platform whereby when the material in strip form is fed to the knives to be cut into cubes, the cubes thus formed will be delivered to the chute and thus discharged from the machine.

JOSEPH P. SPANG.